March 17, 1970 R. E. POLEWSKI 3,500,551

RESTORING MECHANISM FOR A RECORD PLAYER

Filed Jan. 19, 1968 4 Sheets-Sheet 1

INVENTOR.
Robert E. Polewski
BY Hood, Gust, Irish & Evans
ATTORNEYS

RESTORING MECHANISM FOR A RECORD PLAYER

INVENTOR.
Robert E. Polewski
BY Hood, Gust, Irish & Lundy [signature]
ATTORNEYS

RESTORING MECHANISM FOR A RECORD PLAYER

Filed Jan. 19, 1968 4 Sheets-Sheet 3

INVENTOR.
Robert E. Polewski
BY
Hood, Gust, Irish & Evans
ATTORNEYS

INVENTOR.
Robert E. Polewski
BY
Hood, Gerrson & Evans
ATTORNEYS

3,500,551
RESTORING MECHANISM FOR A RECORD PLAYER

Robert E. Polewski, Cincinnati, Ohio, assignor to Rennek Company, Cincinnati, Ohio, a corporation of Delaware
Filed Jan. 19, 1968, Ser. No. 699,221
Int. Cl. G11b *17/06, 3/10*
U.S. Cl. 33—214 5 Claims

ABSTRACT OF THE DISCLOSURE

In a record player having a turntable, drive means for the turntable, and a housing for the drive means, the improvement comprising, in preferred form, a tone arm mounted at one end to the housing, said tone arm having structure defining an elongated aperture, and a lift arm mounted in a slot structure at one end to the housing, the lift arm passing through the elongated aperture to form a generally X-shaped configuration with the one arm at the point of intersection, whereby the tone arm can be mechanically moved between the record playing position and a record changing position by manually raising the lift arm and vertically pivoting it in a slot structure having a recess portion for engagement with the lift arm whereby the tone arm can be maintained in the record changing position.

This invention relates to record players and, more particularly, this invention relates to a portable record player especially adapted for young age groups.

Record players of the prior art generally include three basic components, namely, a turntable, a tone arm, and a speaker system. The tone arm is mounted to the record player's casing or housing for pivotal movement in a horizontal direction so as to move from a record's outer edge to the record's center during playing of that record. The tone arm is also mounted for pivotal movement in a vertical direction so that, once a record has finished playing, a second record may be substituted for it.

One of the primary problems associated with the use of record players by young age groups, for example, teenagers, pre-teenagers, and the like, is that records used on those players tend to become quite scratched. The main reason for the scratching of records, of course, is that a younger person does not usually take great care during changing of a record to insure that damage does not occur to that record. Also, the tone arm's cartridge, as well as the playing needle in that cartridge, tend to become damaged when used by young age groups. At the beginning of a new record the cartridge must be accurately positioned on the outer edge of the record so as to make use of the whole record. In so positioning the cartridge a younger person does not always place it effectively on the first try and often times the needle and cartridge are bounced against the housing or record which, of course, shortens the needle and cartridge life.

In portable record players of the types commonly available for young age groups, one of the problems is to insure adequate protection for the tone arm during transporting of the record player. Known types of tone arm locks are generally relatively complex and, therefore, uneconomical from a manufacturing standpoint. Also, battery power is generally used in such record players so that the turntable speed changes as the power of the batteries is dissipated. That is, known battery powered, portable record players have no means to compensate for normal battery wear during use of the record player. Of course, as the turntable slows in response to less battery power, the music generated by the record player becomes more and more distorted.

The record player of this invention substantially obviates the problems noted above in that it provides a combined lift arm-tone arm whereby a young person can lift a tone arm and cartridge from playing engagement with a record, change the record, and lower the tone arm back down on a new record, all without touching the tone arm or cartridge. In addition, and in combination with the lift arm-tone arm, there is provided a tone arm positioner that can be adjusted for either 33 r.p.m. or 45 r.p.m. records. The tone arm positioner cooperates with the tone arm-lift arm to automatically position the cartridge in playing position at the record's outer edge when starting that new record. An additional feature is a pop-up disc surrounding the turntable's spindle to automatically convert the spindle from 33 r.p.m. to 45 r.p.m. records and vice versa, thereby lessening the chances of damage when changing record speeds.

This invention is readily adapted to portable record players. Such portable record players are provided with, and this invention further contemplates, a novel lock for restraining the tone arm from movement as the record player is being transported. A further feature unique in battery powered record players is the provision of a limited turntable r.p.m. control by means of which the desired turntable r.p.m. can be maintained even as the power supply of the batteries is dissipated, thereby aiding in the prevention of distorted music.

Other objectives and advantages of the invention will be more apparent from the following detailed description taken in conjunction with the drawings in which.

Figure 1:
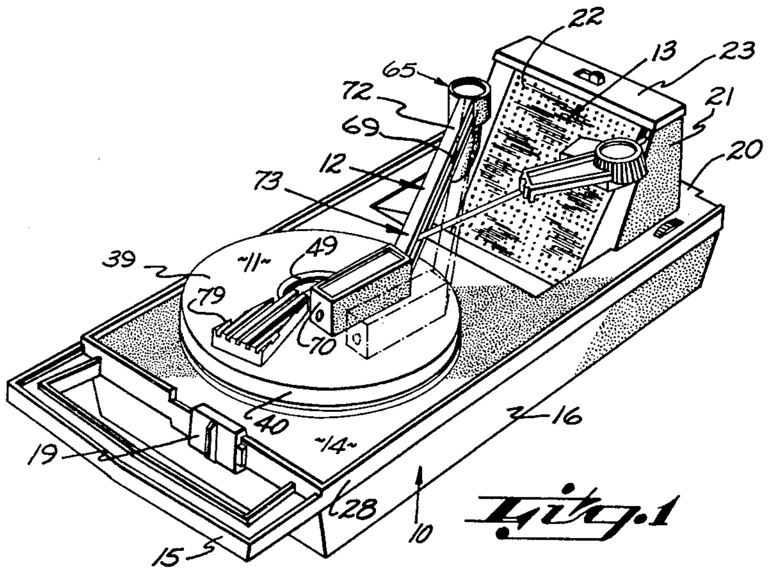
FIGURE 1 is a perspective view illustrating a portable record player incorporating the features of this invention.
Figure 2:
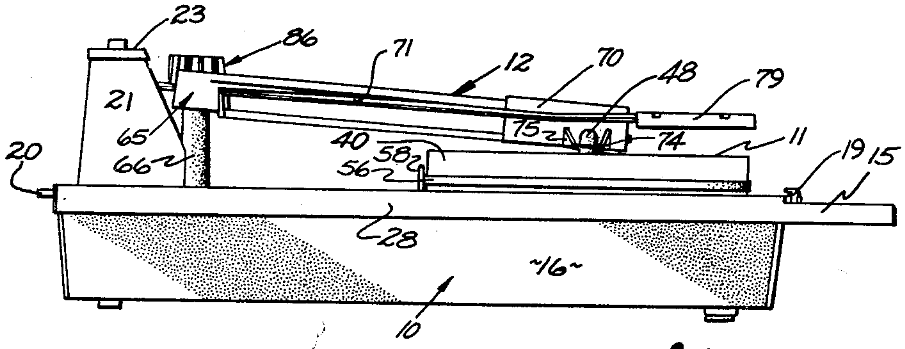
FIGURE 2 is a side view of the record player shown in FIGURE 1.
Figure 3:
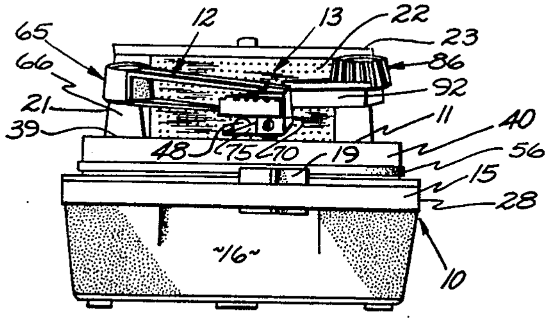
FIGURE 3 is a front view of the record player shown in FIGURE 1.

The portable record player, as illustrated in FIGURE 1, basically includes a housing 10, a turntable 11, a tone arm 12 and a speaker 13, the housing enclosing suitable drive means for the turntable and suitable circuitry for the speaker. The position of the tone arm 12 shown in solid lines illustrates that arm in latching or transporting position (see more particularly FIGURES 2 and 3). The position of the tone arm 12 shown in dashed lines illustrates that arm in record playing position.

The housing 10 includes a lid 14 having a handle 15 integrally molded to it. The lid 14 is held to the housing's base 16 by screws 17 cooperating with posts 18 molded integral with the base, see FIGURES 4 and 5. A speaker casing 21 is molded integral with the top of the lid 14 for enclosing the speaker 13, the front of the speaker casing having a grill facing 22. The speaker casing 21 is also provided with a plate 23 held to the structure by screws 24 to provide easy access to the top of the casing 21. The lid 14 also mounts a latch 19 at its front end and ears 20 at its rear-end for cooperating with a cover, not shown, to enclose all exposed record player components when transporting the record player.

Figures 4, 5:
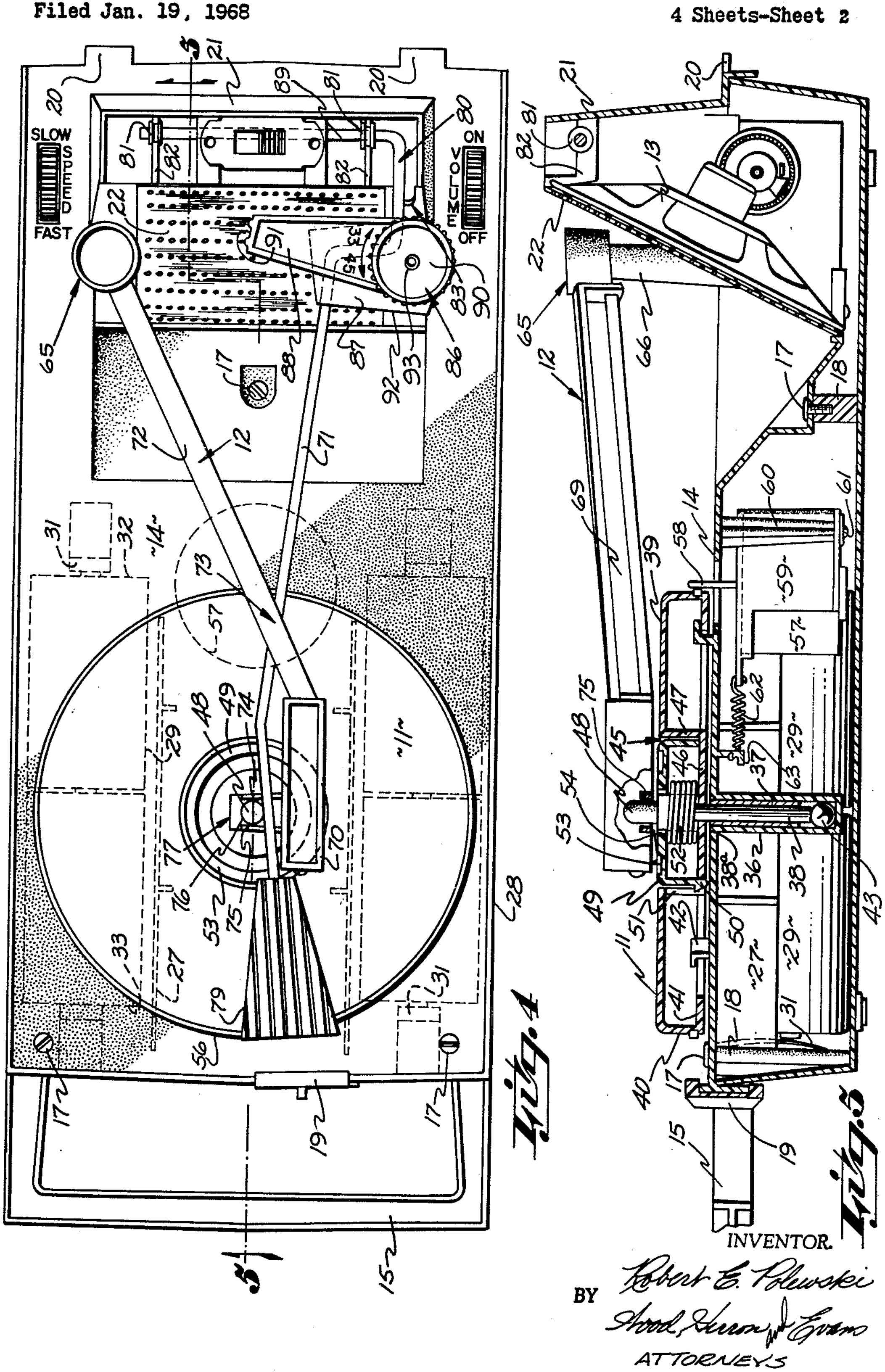
FIGURE 4 is a top view of the record player illustrated in FIGURE 1 with the top of the speaker casing removed.
FIGURE 5 is a cross-sectional view taken along lines 5—5 of FIGURE 4.

The underneath side of the lid 14 mounts suitable retainer walls 27 molded integral with the lid that cooperate with the side walls 28 of the base 16 for retaining the batteries 29 in operating position, see FIGURES 4 and 5. Spring clips 31 are mounted to the underneath side of the lid to engage the leading 32 and trailing 33 ends of each battery pair for establishing the record player's power supply.

The turntable 11 is carried within a retainer sleeve 36 molded integral with the lid's underneath surface, see FIGURE 5. The retainer sleeve is provided with a metal bearing sleeve 37, the bearing sleeve 37 being fixed relative to the retainer sleeve 36. The bearing sleeve receives a shaft 38 to which the turntable 11 is fixably mounted, the shaft 38 rests on a ball 43 positioned in the bottom of the retainer sleeve 36 and extends up into spindle 48. Thus, the main bearing surface between the turntable 11 and the housing 10 is the point of contact between the wall 43 and the end of shaft 38.

The turntable 11 itself provides a circular record carrying surface 39 with depending side wall 40 and a base flange 41 extending inwardly from the bottom of the wall 40. The base flange 41 is adapted to cooperate with hooks 42 molded integral with the lid's top surface to aid in retaining the turntable 11 in operating engagement with the lid 14 and the bearing sleeve 37.

Figures 7, 9:
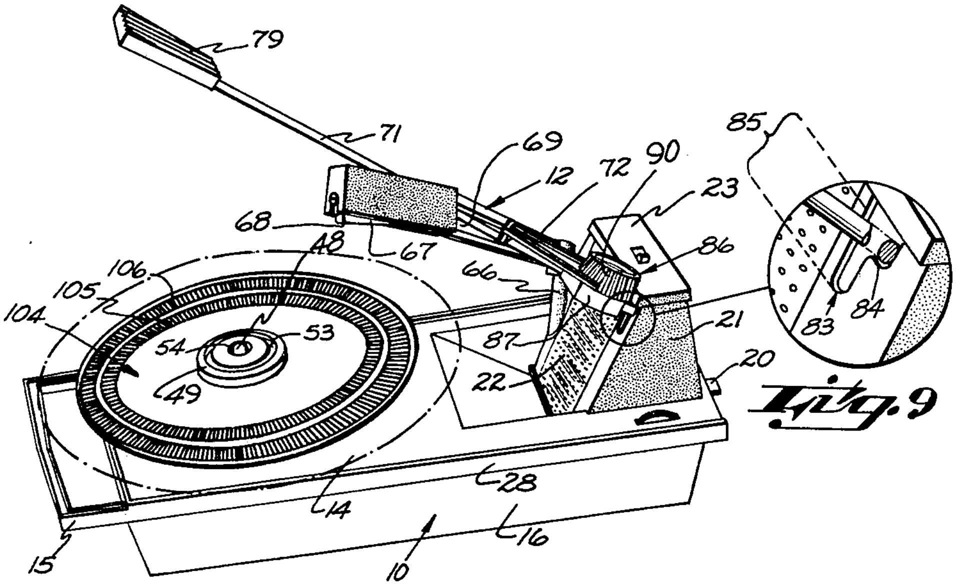
FIGURE 7 is a perspective view of the portable record player illustrating the lift arm-tone arm structure in the record changing position.
FIGURE 9 is an enlarged sectional view of the lift arm latch shown in FIGURE 7.

The turntable 11 has a well 45 with a circular bottom 46 and side wall 47 holded integral with the record surface 39, see FIGURE 5. The spindle 48 is molded integral with and extends upwardly from the bottom 46 of the well 45 to a height substantially above the record surface 39 of the turntable 11. A pop-up crown or disc 49 is mounted in the turntable's well 45 and is dimensioned to be retained within the well by detents 50 cooperating with slots 51 in the side wall 47 of the well. The crown 49 is movable axially relative to the spindle 48 and is continuously spring biased upward by a compression spring 52. A hole 54 is provided in the top of the crown 49 to permit the crown to slide relative to the spindle 48. The compression strength of the spring 52 is such that the weight of a 33 r.p.m. record will depress the crown 49 to a point where the crown's top surface is even with the record surface 39, see FIGURE 5. However, when a 45 r.p.m. record is used, and to accommodate the center hole in a 45 r.p.m. record which is substantially larger than the center hole of a 33 r.p.m. record, the crown will remain in the pop-up position, see FIGURE 7, because it is continuously spring biased upward. Thus, the pop-up crown automatically adjusts the spindle diameter to accommodate either a 33 r.p.m. or a 45 r.p.m. record. The top surface of the pop-up crown 49 is also provided with a circular depression 53 so the cartridge needle 67 does not get damaged when the cartridge is locked in position with the spindle 48, as will be subsequently described in further detail.

The outer wall 47 of the turntable 11 is provided with a circular drive ring 56 appropriately recessed in the outer wall, see FIGURE 5. The drive ring 56 cooperates with a motor 57 and spindle 58 that provide a rim drive for the turntable 11. The motor is mounted in a motor rack 59 that can move radially relative to the turntable 11. The rack 59 is mounted to posts 60 molded integral with the underneath side of the lid 14 by screws 61. The rack 59 is continuously biased inwardly toward the spindle 48 by means of a tension spring 62 connected at one end to the motor rack and at the other end to a depending hook 63 molded integral with the underneath side of the lid 14.

The tone arm 12 is mounted by a swivel mounting 65 to a support post 66 molded integral with the lid 14 and the mounting is such that it can be pivoted in horizontal as well as vertical planes. A cartridge 67 with a needle 68 is carried in head 70 of the tone arm 12. Extension bar 72 of the tone arm 12, that is, that part of the arm 12 extending between the head 70 and the swivel mounting 65, is provided with an elongated aperture 69 for cooperation with a lift arm 71 as will be subsequently described, see FIGURE 2. A horizontally extending flange 74, reinforced by angle pieces 75, is provided with a locking aperture 76 to form a tone arm lock 77 that is molded integral with the head 70 of the tone arm 12. When the record player is to be transported, the tone arm 12 need merely be moved toward the center of the turntable 11 and the aperture 76 in the flange 74 placed over the spindle 48, thereby immobilizing the tone arm and protecting the cartridge 67. The depression 53 provided in the pop-up crown 49 is positioned so that, when the tone arm 12 is locked with the spindle 48, the needle 68 will not scratch on the top surface of the crown.

The lift arm 71 is positioned so it passes through the aperture 69 in the tone arm 12 to form a generally X-shaped configuration at the point of intersection 73. The lift arm 71 is provided with a lifting tab 79 at its free end and carries a U-shaped hook 80 by which it is pivotably mounted at the other end in the speaker casing 21, see FIGURE 4. The lift arm 71 is pivotally mounted inside the speaker casing 21 through bearing sleeves 81 carried by cross supports 82 molded integral with the casing 21, see FIGURE 4. Extension 89 of the hook 80 is also slidable axially within the sleeves 81. The lift arm 71 extends into the speaker casing 21 through a slot 83 in the casing. The slot 83 is of a length 85, and is configured, to provide a rest or recess 84 at its upper end. The slot 83 permits movement of the lift arm and, hence, the tone arm 12, relative to the turntable 11 between a record playing and a record changing position, see FIGURES 1, 7 and 9. Thus, when the lift arm 71 is moved to the record changing position it can be moved axially relative to the fixed bearing sleeves 81 so that the lift arm seats itself within the locking rest or recess 84 (see FIGURE 9) of the speaker casing thereby maintaining the tone arm in the upraised position until the record is changed.

A tone arm positioner 86 is mounted to the exposed side of the lift arm's hook 80. The positioner 86 includes a base or mounting section 87 permanently mounted to the lifting arm 71. A regulator finger 88 and knob 90 are pivotally mounted to the base 87 by a rivet 93. The knob 90 is molded integral with the finger 88 and is provided with suitable serrations for easy positioning of the finger 88. The regulator finger 88 is of a length to present an outer limit stop edge 91 for a 45 r.p.m. record (see solid lines of FIGURE 6 for 45 r.p.m. position). The finger 88 is pivotable to a 33 r.p.m. record position and thereby exposes an outer limit stop shoulder 92 of the base 87 (see dashed lines of FIGURE 6 and solid lines of FIGURE 4 for 33 r.p.m. position). Thus, the tone arm positioner 86 moves up and down with the lift arm 71 as the lift arm is moved between record playing and record changing positions because the positioner 86 is mounted to the lift arm.

Figure 6:
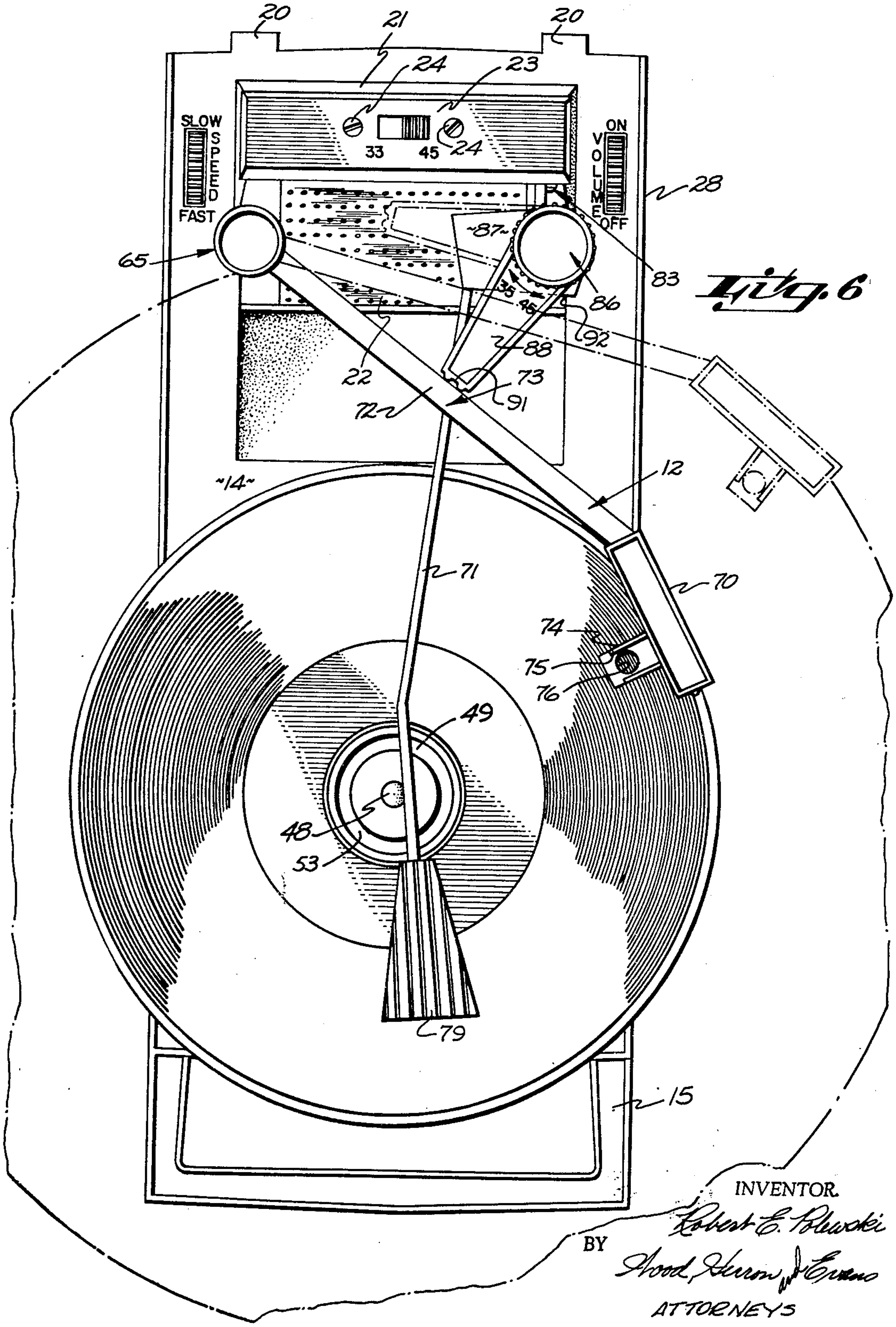
FIGURE 6 is a view similar to FIGURE 4 but illustrating the tone arm-lift arm positioner in initial record playing positions for a 33 r.p.m. record (dashed lines) and for a 45 r.p.m. record (solid lines)

In operation, when the record to be played is a 45 r.p.m. record the finger 88 is moved to the position illustrated in solid lines in FIGURE 6. The lift arm 71 is then raised, carrying the tone arm 12 upwards with it, and as the lift arm is raised the tone arm slides along the lift arm until it abuts edge 91 of the finger 88, see FIGURE 7. In the record changing position the lift arm 71 is seated in the rest 84 of the speaker casing 21 to maintain the tone arm 12 in the upright position as the record is changed. Thus, the record can be changed without fear of the tone arm 12 prematurely falling onto the record.

Once the record is changed the lift arm 71 is moved out of the recess 84 and lowered to the record playing position, see FIGURE 6. Because the tone arm 12 has abutted against the edge 91 of the finger 88, when the tone arm reaches record playing position the needle will automatically be positioned at the outer edge of the 45 r.p.m. record.

The operation is the same for a 33 r.p.m. record except the finger 88 is shifted to the position illustrated by dashed lines in FIGURE 6 and the tone arm 12 abuts against the stop shoulder 92 of the base 87 when in the upraised position. When the lift arm 71 is lowered the needle will be automatically positioned at the outer edge of the 33 r.p.m. record.

Figure 8:
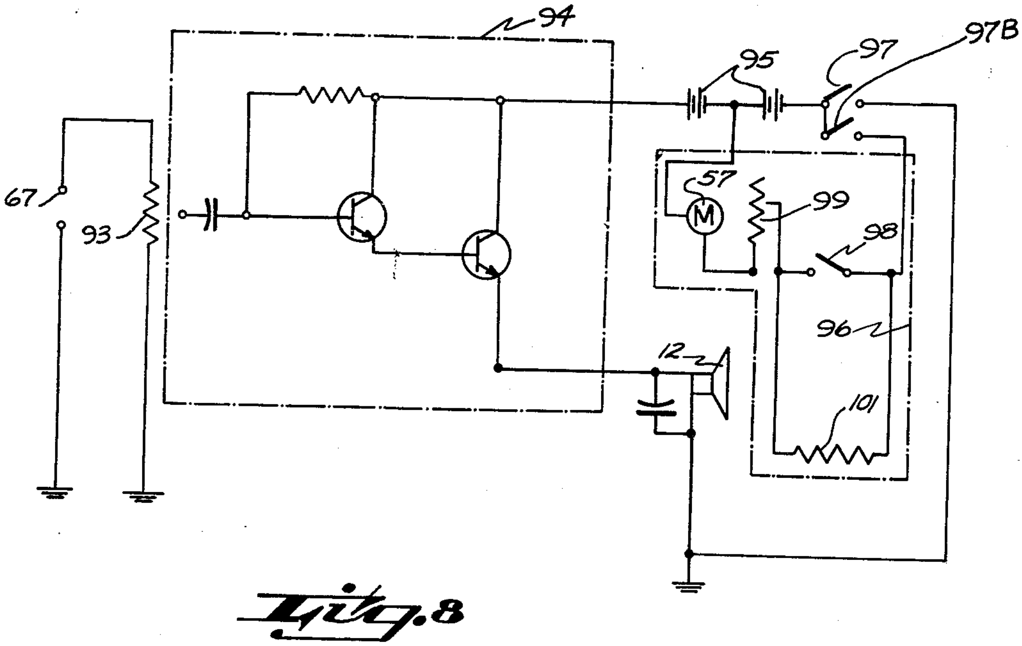
FIGURE 8 is a diagram illustrating the circuitry used in the portable record player.

The speaker 12, cartridge 67 and turntable motor 57 are all integrated into an electrical circuit illustrated in FIGURE 8. The circuit basically includes the cartridge pick-up 67, the speaker 12, a volume control 93, an amplifier stage 94, a battery power source 95, a motor circuit 96, and an off-on switch 97. The motor circuit 96 is provided for driving the turntable 11 at accurately controlled, selectively variable speeds. The motor circuit 96 is connected across a source of direct current 95 via pole 97B of a double pole, single throw switch 97 which controls energization of the circuit. Included in the motor circuit 96 is a D.C. motor 57. The motor 57 has one terminal thereof connected to the power supply 95, and another terminal thereof connected to the fixed contact of the switch 97 via the series circuit that includes a fine speed control or variable resistor 99 and the parallel combination of a 33 r.p.m.–45 r.p.m. switch 98 and a resistor 101. Resistor 101 is selected such that the motor 57 drives the turntable 11 at a speed of 33 r.p.m. when the switch 98 is open and the resistor 101 is effectively in electrical series circuit arrangement with the motor. Resistor 99 is selected to provide minor deviations in the speed of the motor 57 when adjusted throughout its range.

In operation, the motor 57 is energized to drive the turntable 11 by closing the switch 97. The nominal speed at which the motor 57 drives the turntable 11, namely, either 33 r.p.m. or 45 r.p.m., depends upon the condition of switch 98. Specifically, in the open switch position shown, resistor 101 is in series circuit arrangement with the motor 57, causing the motor to have a nominal operating speed of 33 r.p.m. Alternatively, with the switch 98 closed and the resistor 101 short-circuited, the motor 57 operates at a nominal speed of 45 r.p.m. Deviations from either a nomial speed of 33 r.p.m. or 45 r.p.m. for the purposes of fine speed control are produced by altering the effective resistance of the variable fine speed control resistor 99. Specifically, increasing and decreasing the resistance of resistor 99 is effective to decrease and increase the nominal motor speed, respectively.

The fine speed control 99 is used once it has been determined whether or not a 33 r.p.m. or 45 r.p.m. record is to be played. After placing a record on the turntable 11 a conventional strobe disc 104 having a ring of lines 105 correctly spaced for 33 r.p.m. records and a ring of lines 106 correctly spaced for 45 r.p.m. records is placed on the record, see FIGURE 7. The cartridge and needle are then lowered into record playing position at a point on the record not covered by the disc 104. A fluorescent light, not shown, is then exposed to the strobe disc 104 as the record is played and when the relevant lines (33 r.p.m. lines for a 33 r.p.m. record and 45 r.p.m. lines for a 45 r.p.m. record) appear stationary the turntable 11 is actually turning at the desired speed The turntable speed is corrected and adjusted by the fine control 99 to the actual desired r.p.m. after switch 98 has been positioned to provide approximately the desired 33 r.p.m. or 45 r.p.m. Such a fine speed control 99 for the battery powered record player permits the actual desired r.p.m. to be maintained as the power is dissipated from the batteries.

The circuitry of the portable record player is more specifically set forth and described in copending application Ser. No. 699,177 invented by Charles P. Boegli.

What I desire to claim and protect by Letters Patent is:

1. In a record player having a turntable, drive means for the turntable, and a housing for the drive means, the improvement comprising:

a tone are directly connected at one end to the housing, said tone arm having structure defining an elongated aperture positioned longitudinally of said tone arm, a lift arm directly connected at one end to the housing and adapted to cooperate with the tone arm for vertically pivoting the tone arm between a record playing position and a record changing position, said lift arm passing through said elongated aperture to form an X-shaped configuration therewith at their point of intersection and being dimensioned so that said tone arm is slidable relative to said lift arm, and a slot structure associated with said housing through which the lift arm passes, said slot structure including a slot portion that permits said lift arm to be vertically pivoted and a recess portion with which said lift arm is engageable that permits said lift arm to be maintained in the record changing position.

2. An improvement as set forth in claim 1 including:

a tone arm positioner having a base and a finger mounted to said lift arm for establishing placement of the tone arm's needle at the outer edge of a record when said lift arm is moved to the record playing position from the record changing position, said finger being selectively movable between a first position whereat said base presents an abutment for locating the tone arm when playing a large diameter record and a second position whereat said finger presents an abutment for locating the tone arm when playing a small diameter record.

3. An improvement as set forth in claim 1 including:

locking means mounted to the other end of said tone arm, said locking means being engageable when desired with the spindle of said turntable to immobilize said tone arm relative to said housing.

4. An improvement as set forth in claim 3 wherein said locking means comprises a flange extending outwardly from one side of said tone arm, said flange defining an aperture within which the spindle is positionable.

5. An improvement as set forth in claim 1 wherein said lift arm includes an extension carried in bearing means connected to said housing for permitting pivotable movement of said lift arm, said lift arm also being moveable substantially transverse to its plane of pivotable movement when permitted by said slot structure.

References Cited

UNITED STATES PATENTS

| | | | |
|---|---|---|---|
| 1,485,137 | 2/1924 | Hunter | 274—14 |
| 2,066,859 | 1/1937 | Schiler | 274—14 |
| 2,972,483 | 2/1961 | Rogers | 274—14 |
| 3,244,423 | 4/1966 | Freathy et al. | 274—23 |

FOREIGN PATENTS

| | | |
|---|---|---|
| 114,471 | 1941 | Australia. |
| 616,469 | 1949 | England. |

LEONARD FORMAN, Primary Examiner

DENNIS A. DEARING, Assistant Examiner

U.S. Cl. X.R.

274—1, 23